Patented June 29, 1937

2,085,528

UNITED STATES PATENT OFFICE 2,085,528

PREPARATION OF COLORING COMPOSITIONS

Ernst Alexander Grenquist, Bloomfield, N. J., assignor to Celluloid Corporation, a corporation of New Jersey No Drawing. Application November 9, 1934, Serial No. 752,258

3 Claims. (Cl. 106—37)

This invention relates to the manufacture of compositions of matter containing nitro-cellulose suitable for coloring and/or increasing the covering power of films, foils, sheets, filaments, etc. made of or containing plastic materials such as nitro-cellulose and other derivatives of cellulose.

An object of this invention is the economic and expeditious production of pigmented material or color master material for addition to plastics, lacquers, material for forming foils, sheets, films, filaments, etc. Another object of the invention is the production of color master batches, sometimes referred to as "lacquer chips", containing nitro-cellulose wherein the pigment coloring material is evenly dispersed as the external phase and so dispersed that, in working and handling, the pigment does not form agglomerates or grit. Other objects of the invention will appear from the following detailed description.

It previously has been proposed to incorporate white or colored inorganic pigment-like material in plastic materials used in forming films, foils, sheets, articles and lacquers in order to lend to such material a high covering power, a subdued luster and/or a color. In commercial processes involving the use of pigment-like materials, it was necessary to subject the pigments to prolonged and elaborate grinding processes in order to attain the degree of subdivision necessary to avoid reducing the strength of the resulting articles to an undue extent. However, even after such prolonged grinding, the size of the pigment particles is not reduced to as great a degree as is often desired.

Further, it previously has been proposed to incorporate the pigment-like material into the plastic material by first forming a color master material by working the pigment into a plastic mass of a derivative of cellulose dissolved in a mixture of solvents as well as a plasticizer of good solvent power, such as dibutyl phthalate, which produced an improved dispersion. I have now found that it is possible to use a plasticizer that is deficient in solvent power for the derivative of cellulose, as compared with dibutyl phthalate, or even a non-solvent and yet obtain a uniform pigment dispersion and a good stability while working and handling. Furthermore, the pigments do not tend to agglomerate or form lumps of grit.

Another advantage of my invention is the ease with which the color master material may be formed. In working the same in mixers and on malaxating rolls it does not stick to the metal and may be rolled to very thin sheets, say 5/1000 of an inch or less, with the desired flow of material at the nip of the rolls. This property of ease of working allows a better conversion of the material to take place, resulting in deeper and more even shades of color or opacity in the final product.

In accordance with my invention, I form a color master material or lacquer chip material containing nitro-cellulose and a pigment by dispersing the pigment as the internal phase in a solution of nitro-cellulose and the material of low or no solvent action for the nitro-cellulose in such a manner and amounts as to form a product superior to any heretofore produced. The lacquer chip material may be added to or diluted with plastic material or solutions of same to form lacquers, solutions for use in forming filaments, films, sheets, artificial straw, tubing, etc. The plastic material or solutions of same may contain nitro-cellulose, organic esters of cellulose, cellulose ethers, synthetic or natural resins and resinous materials, etc. Examples of organic esters of cellulose are cellulose acetate, cellulose formate, cellulose propionate and cellulose butyrate while examples of cellulose ethers are methyl cellulose, ethyl cellulose and benzyl cellulose.

As stated, this invention relates to the manufacture of color master material or lacquer chip material and to articles and materials containing same. This color master material may contain a pigment dispersed in nitro-cellulose. This pigment may be white to obtain subdued luster and increased opacity in the article or material to which it is added. Examples of white inorganic pigments are tin oxide, tin phosphate, antimony oxide, titanium dioxide, barium sulfate, lead sulfate, calcium sulfate, zinc oxide, zinc carbonate, aluminum oxide, silicon dioxide, barium borate, calcium borate and silicates such as china clay or other clays, talc or mica. The pigment, however, may be of organic nature, such as diacetyl benzidine, diacetyl toluidine, dibenzoyl benzidine, naphthyl urea, anthraquinone, anthracene or suitable synthetic or natural resins.

This invention is of particular interest for the preparation of colored materials, in which case a colored inorganic or organic pigment may be employed to obtain the desired color or shade. For a yellow color, ochre, sienna, chrome yellow, tin bronze, etc. may be employed. For a red color, Venetian red, red lead, vermillion, etc. may be employed. For a blue color, ultramarine, Prussian blue, Milori blue, etc. may be used. For green, Guignet's green, verdigris, chrome green may be employed. For brown raw ombre, burnt ombre or Vandyke brown may be used. For black and gray, lamp black, carbon black, graphite or other black pigment may be used, which may be toned with iron gallate, Prussian blue or other toners to obtain jet blacks. To obtain any other colors, the pigments may be mixed as is well understood in the paint art.

This invention is particularly applicable to the formation of a color master material containing pigments that by previous methods were extremely difficult to disperse in the nitro-cellulose, such as carbon blacks, iron blues, precipitated lakes and toners, etc. The carbon black may be the so-called colloidal type.

Any type of nitro-cellulose may be employed. It is preferable, however, to employ ½ second viscosity nitro-cellulose containing from 25 to 35% of grain alcohol (95% grain alcohol). The parts of nitro-cellulose quoted in the specification and claims is on the dry basis and the alcohol or its equivalent that is found in the commercial nitro-cellulose is quoted with the low boiling solvent mixtures. To this nitro-cellulose there may be added the pigment, the solvent, preferably of a mixture of solvents having at least one low boiling and one high boiling solvent, and the plasticizing material having a reduced or no solvent action.

Any suitable low boiling solvent may be employed that is easily removed from the material by working the same on the rolls. It should not cause any sticking troubles and should act preferably in a manner to dilute the high boiling solvents. Alcohols are ideally suited for this purpose. Thus, besides the 25 to 35% of grain alcohol found in commercial nitro-cellulose, there may be added from 15 to 25% of anhydrous alcohol, isopropyl alcohol, isopropyl ether or a mixture of two or more of same.

Besides the low boiling solvent, the solvent mixture may contain from 15 to 25% of a medium boiling solvent or the same may be considered as a dispersing agent. For example, butyl alcohol, amyl alcohol or any other liquid boiling between 100° C. and 125° C. which is a poor solvent for the nitro-cellulose may be employed.

The high boiling solvents contained in the solvent mixture may be any high boiling solvent for nitro-cellulose. For example, butyl acetate, amyl acetate, the ethyl ether of ethylene glycol, ethyl ether of ethylene glycol acetate, etc. may be employed. The high boiling solvent may be employed in amounts of from 15 to 25% on the weight of the nitro-cellulose.

The plasticizing material having a reduced or no solvent action for nitro-cellulose that is to be added to the material may be a mixture of 5 parts of tricresyl phosphate and 1 part of castor oil, castor oil alone, butyl stearate and similar materials. This plasticizing material of reduced or no solvent action for nitro-cellulose may be employed in amounts of from 20 to 30% on the weight of the nitro-cellulose. Other oils, such as olive oil, linseed oil, tea seed oil, etc., may be substituted for all or a part of the castor oil. Further, in employing mixtures of tricresyl phosphate and oil, the ratio of oil to tricresyl phosphate may vary from 1:4 to 1:8. Other trialkyl or triaryl phosphates may be substituted for tricresyl phosphate.

The sequence of mixing these materials is also of importance. The preferred method is to employ a Banbury type mixer; however, other types may be employed. About 20 parts of pigment are placed in the bottom of the mixer. One half or about 30 parts of the specified solvent is poured on top after starting the mixer. One half or about 50 parts of the nitro-cellulose containing about 15 parts of grain alcohol is added immediately and gradually so that it is continuously churned up between the blades of the mixer and mixed with the pigment. The plasticizing material of reduced or no solvent action on the nitro-cellulose amounting to about 30 parts, is then added and followed by the rest or about 50 more parts of nitro-cellulose containing about 15 parts of grain alcohol. In this method the mass converts immediately and the total mixing time may be approximately 6 minutes.

The batch so formed may then be transferred to malaxating rolls adjusted for approximately $\frac{1}{16}$ inch or less clearance. The material maintains a good flow in the nip of the rolls. After sufficient working, the material may then be placed in a container and sprinkled with the balance, or about 30 parts, of the solvent mixture. After standing in the container, sealed against evaporation of the solvent, for from 20 to 30 hours, the material is replaced on the malaxating rolls and run through as thin as possible, say from less than 5/1000 of inch to $\frac{1}{32}$ of an inch.

During the processing the material may have absorbed some moisture which tends to throw the final product off color. The material may be dried to remove the moisture by forming same into slabs and drying it about 70° C. with or without vacuum until the residual low boiling solvent is less than 4%, after which it may be cut or broken into pieces for packaging in containers or admixture with plastic materials or solutions of same.

The amount of pigment employed will depend somewhat on the size and nature of same. If too large an amount of pigment is employed, a change in phase may result. In employing pigments of about the specific gravity of carbon black and which has a particle size in the resulting product of, for the most part, below 2 microns, it is preferable to employ between 20 or less and 50 parts of pigment to 100 parts of nitro-cellulose. When the heavier metallic oxide pigments are employed, however, as much as 500 parts to 100 parts of nitro-cellulose may be employed.

As an illustration and not as a limitation the following example is given.

*Example*

About 20 parts of colloidal type carbon black is placed in the bottom of a Banbury mixer. Thirty parts of a 1:1:1 mixture of anhydrous alcohol: butyl alcohol: butyl acetate is added to the carbon black after starting the mixer. Fifty parts of nitro-cellulose containing 15 parts of grain alcohol are added immediately and gradually, 30 parts of a 25:5 mixture of tricresyl phosphate and castor oil are added and then 50 more parts of nitro-cellulose containing 15 parts of grain alcohol are added and the batch mixed for five minutes. The batch is then transferred to malaxating rolls and worked as thin as consistency allows. The batch is then sprinkled with 30 parts of 1:1:1 mixture of anhydrous alcohol, butyl alcohol and butyl acetate and stored in sealed containers for 24 hours. The batch is again worked on the rolls pulling the same through as thin as consistency allows. The material is then dried at 70° C. to reduce the amount of low boiling solvent present to less than 3%.

It is to be understood that the foregoing detailed description is merely given by way of illustration and many alterations may be made therein without departing from the spirit of my invention.

By the term "color master material" as employed hereinafter in the claims is meant a solid pigmented composition adapted to be incorporated in plastics, lacquers, solutions to be employed for the production of sheets, films, foils and filaments, and like materials.

Having described my invention what I desire to secure by Letters Patent is:

1. A method of manufacturing a color master material containing a pigment and a plasticized nitrocellulose, which comprises mixing a pigment and a high boiling solvent for nitrocellulose diluted with a thinner, adding to the mixture substantially one-half of the nitrocellulose to be employed, then adding a mixture of a plasticizer deficient in solvent power for the nitrocellulose and the other portion of the nitrocellulose, working the mixture on malaxating rolls, adding another portion of a high boiling solvent for nitrocellulose diluted with a thinner, ageing the mixture and again working the mixture on malaxating rolls.

2. A method of manufacturing a color master material containing a pigment and a plasticized nitrocellulose, which comprises mixing a colloidal type carbon black and a high boiling solvent for nitrocellulose diluted with a thinner, adding to the mixture substantially one-half of the nitrocellulose to be employed, then adding a mixture of a plasticizer deficient in solvent power for the nitrocellulose and the other portion of the nitrocellulose, working the mixture on malaxating rolls, adding another portion of a high boiling solvent for nitrocellulose diluted with a thinner, ageing the mixture and again working the mixture on malaxating rolls.

3. A process in accordance with claim 1 wherein tricresyl phosphate is employed as the plasticizer deficient in solvent power for the nitrocellulose.

ERNST ALEXANDER GRENQUIST.

CERTIFICATE OF CORRECTION.

Patent No. 2,085,528.                                June 29, 1937.

ERNST ALEXANDER GRENQUIST.

It is hereby certified that error appears in the printed specification of the above numbered patent requiring correction as follows: Page 2, second column, line 48, for the numeral "2", read 0.2; and that the said Letters Patent should be read with this correction therein that the same may conform to the record of the case in the Patent Office.

Signed and sealed this 31st day of August, A. D. 1937.

(Seal)

Leslie Frazer
Acting Commissioner of Patents.

again worked on the rolls pulling the same through as thin as consistency allows. The material is then dried at 70° C. to reduce the amount of low boiling solvent present to less than 3%.

It is to be understood that the foregoing detailed description is merely given by way of illustration and many alterations may be made therein without departing from the spirit of my invention.

By the term "color master material" as employed hereinafter in the claims is meant a solid pigmented composition adapted to be incorporated in plastics, lacquers, solutions to be employed for the production of sheets, films, foils and filaments, and like materials.

Having described my invention what I desire to secure by Letters Patent is:

1. A method of manufacturing a color master material containing a pigment and a plasticized nitrocellulose, which comprises mixing a pigment and a high boiling solvent for nitrocellulose diluted with a thinner, adding to the mixture substantially one-half of the nitrocellulose to be employed, then adding a mixture of a plasticizer deficient in solvent power for the nitrocellulose and the other portion of the nitrocellulose, working the mixture on malaxating rolls, adding another portion of a high boiling solvent for nitrocellulose diluted with a thinner, ageing the mixture and again working the mixture on malaxating rolls.

2. A method of manufacturing a color master material containing a pigment and a plasticized nitrocellulose, which comprises mixing a colloidal type carbon black and a high boiling solvent for nitrocellulose diluted with a thinner, adding to the mixture substantially one-half of the nitrocellulose to be employed, then adding a mixture of a plasticizer deficient in solvent power for the nitrocellulose and the other portion of the nitrocellulose, working the mixture on malaxating rolls, adding another portion of a high boiling solvent for nitrocellulose diluted with a thinner, ageing the mixture and again working the mixture on malaxating rolls.

3. A process in accordance with claim 1 wherein tricresyl phosphate is employed as the plasticizer deficient in solvent power for the nitrocellulose.

ERNST ALEXANDER GRENQUIST.

CERTIFICATE OF CORRECTION.

Patent No. 2,085,528.  June 29, 1937.

ERNST ALEXANDER GRENQUIST.

It is hereby certified that error appears in the printed specification of the above numbered patent requiring correction as follows: Page 2, second column, line 48, for the numeral "2", read 0.2; and that the said Letters Patent should be read with this correction therein that the same may conform to the record of the case in the Patent Office.

Signed and sealed this 31st day of August, A. D. 1937.

(Seal)

Leslie Frazer
Acting Commissioner of Patents.

CERTIFICATE OF CORRECTION.

Patent No. 2,085,528. June 29, 1937.

ERNST ALEXANDER GRENQUIST.

It is hereby certified that error appears in the printed specification of the above numbered patent requiring correction as follows: Page 2, second column, line 48, for the numeral "2", read 0.2; and that the said Letters Patent should be read with this correction therein that the same may conform to the record of the case in the Patent Office.

Signed and sealed this 31st day of August, A. D. 1937.

(Seal)

Leslie Frazer
Acting Commissioner of Patents.